Jan. 7, 1969 E. M. DEXTER 3,420,109
READOUT FOR A VORTEX RATE-OF-TURN SENSOR
Filed Feb. 5, 1965 Sheet 1 of 2

INVENTOR
EDWIN M. DEXTER

BY *Hurwitz & Rose*

ATTORNEYS

United States Patent Office 3,420,109
Patented Jan. 7, 1969

3,420,109
READOUT FOR A VORTEX
RATE-OF-TURN SENSOR
Edwin M. Dexter, Silver Spring, Md., assignor to Bowles
Engineering Corporation, Silver Spring, Md., a coporation of Maryland
Filed Feb. 5, 1965, Ser. No. 430,697
U.S. Cl. 73—505                    18 Claims
Int. Cl. G01p *15/00*

ABSTRACT OF THE DISCLOSURE

A readout system for a vortex rate sensor employs a pressure controlled oscillator responsive to an output pressure from said sensor to provide a signal having a frequency which varies about a center frequency as a function of the rate and sense of rotation of fluid in the sensor. In a preferred embodiment, a differential output pressure from said sensor controls the frequencies of a pair of pressure controlled oscillators such that the difference between said frequencies is a measure of the rate and sense of rotation of fluid in the sensor.

---

The present invention relates to vortex rate-of-turn sensor systems and, more particularly, to a readout device for vortex rate-of-turn sensors which imparts greatly improved operating characteristics of the system.

In a conventional vortex rate-of-turn sensor construction a relatively large, flat, hollow, cylindrical member is provided with an inner porous annulus which defines, between an outer wall of the device and the porous annulus, a chamber in which fluid is introduced. A relatively small centrally located egress orifice is provided coaxially of and interiorly of the porous annulus ring. Fluid introduced into the chamber between the outer wall of the device of the porous wall flows through the wall and radially towards the egress orifice and thence out through the egress orifice.

If the device is rotated about the axis of the porous ring, fluid proceeding through the porous ring is introduced into the interior of the device with a tangential component causing the fluid in the chamber to rotate. The rotation of the fluid at the periphery of the device; that is, at the inner surface of the porous ring, is amplified so that the rate of rotation of the fluid exiting through the egress orifice is considerably greater than the rate of rotation of the fluid at the porous ring. The amplification factor is a function of the square of the inner diameter of the porous ring divided by the diameter of the egress orifice.

Devices of this type have been found useful due to their simplicity since no rotating masses are required to produce a rate of turn indicator. Considerable difficulty has been experienced, however, in rendering these devices as sensitive to rate of turn as is desirable, due to the high noise levels in such apparatus. Numerous improvements have been made in the past several years in reducing the noise level of such devices, but the level has not been reduced to the extent that would appear to be desirable, particularly with reference to certain possible fields of application of these devices.

It is apparent that the noise level in any system determines the minimum signal level that can be detected. Relating this factor to the devices with which the present invention is concerned, the noise of the system determines the smallest rate of turn that the system can measure. If the amplitude of the signal produced as a result of a specific rate of turn is not greater than the noise signals, then the signal cannot be recognized as other than noise. Thus, only signals which exceeds the level of the noise can be detected by the system.

In vortex systems, however, noise is not the only criteria for measuring the performance. The delay of response of the vortex amplifier or rate sensor must also be taken into account. More specifically, since the rate-of-turn signal is introduced at the interior of the porous wall or annulus a certain delay is inherent in this device due to the time required for the fluid to flow from the interior surface of the porous ring to a detector located in the egress orifice. This transport time is reduced by increasing the supply pressure to the apparatus. Unfortunately, however, as the supply pressure is increased the noise factor is increased. Thus, there must be a trade-off between rate of response and minimum rate of rotation that can be detected in any given system.

The plot of the threshold rate of turn expressed in radians per second as a function of transport time for any given system is a straight line when plotted on log-log paper. It is one object of the present invention to be able to shift this entire curve so that for a given rate of response much smaller rates of turn can be detected or, conversely, for a given rate of turn, a much faster response can be effected. Such improvements require that the noise which affects the detector be reduced for any given flow rate in the vortex amplifier.

These improvements are effected in accordance with the present invention, by eliminating all signals and thereby eliminating all systematic noise signals, i.e. noise signals made up of sinusoidal components, which lie above a predetermined frequency. Investigation has proven that a considerable percentage of the noise in the vortex amplifier system lies above the frequencies which are of interest in a control system. There are numerous ways of eliminating frequencies, the more conventional, of course, being by means of filter networks. However, in accordance with a further feature of the present invention, these higher frequencies are eliminated in a system which provides a number of additional important advantages over those which could be obtained by employing simple filter networks.

In accordance with such a further feature of the present invention, the higher frequency components are eliminated by a pure fluid pressure controlled oscillator whose center frequency is chosen such that it cannot respond to the higher frequency noise signals. A pressure controlled oscillator is one in which the frequency of oscillation is a function of pressure supplied to its power nozzle. The additional features which are derived by employing a pressure controlled oscillator as the noise filter or integrator are that the elements which are employed to measure rate of turn, now represented by the frequency of oscillation of the oscillator, are A.C. or digital elements in which the effects of drift and bias are eliminated. In all pure fluid systems which operate on D.C. levels, drift and bias changes are difficult problems due to inevitable variations, i.e. drift, in supply pressures. However, by employing the pressure controlled oscillator, which is in effect an analog-to-digital converter, the portions of the system downstream of this converter or oscillator are operating as digital elements with all of the advantages inherent in such operation. Other analog-to-digital converters might be employed but the use of the pressure controlled oscillator provides an additional advantage in that it may be operated directly from the rate sensor readout device. No amplification is required and therefore a further source of drift error is eliminated.

In accordance with a still further feature of the present invention, the oscillator system is also rendered insensitive to drift or changes in the D.C. level of pressure in the egress orifice by employing two such oscillators operating differentially. More particularly, the flow in the egress orifice of a vortex rate-of-turn sensor rotates, as indicated above, at a rate which is proportional to the rate of turn of the entire unit, and in a direction which is determined by the direction of turn of the unit. If a pick-up device is employed which produces two output signals varying differentially with direction and rate of rotation and these signals are applied to two pressure controlled oscillators, then the frequency of the pressure controlled oscillators varies differentially with rate of rotation. If now the characteristics of the oscillators are linear with pressure and their characteristics are substantially identical, then any drift in the D.C. pressure level in the egress orifice produces precisely the same effect in both oscillators and the system, which is sensitive to changes in frequencies between the two oscillators, will not recognize this change or changes resulting from temperature changes.

By employing a system of the type described above, the entire system, including the transducers, is rendered insensitive to drift in D.C. supply pressures and biases. Thus, not only does such a system provide a means for eliminating noise above a certain frequency but also introduces a high degree of stability into the overall operation of the system which was not previously available from prior art rate-of-turn systems.

One additional advantage to the system resides in the fact that by simply integrating the A.C. or digital signal, the rate-of-turn sensor is converted to a position sensing system and by sensing both the rate and integrated signals all information necessary to operation of a closed or open servo loop is available. Integration is or may be performed by counting pulses thus preserving the digital aspects of the system.

It is therefore another object of the present invention to provide a vortex rate-of-turn output sensing system which is relatively insensitive to changes in D.C. pressures and biases in the system.

It is yet another object of the present invention to provide a readout device for vortex rate-of-turn sensors which has an improved rate-of-turn threshold versus transport time characteristics, and which renders a system in which it is employed relatively insensitive to drift in pressure or pressures supplied to the system.

Still another object of the present invention is to provide a rate-of-turn vortex system in which a pressure controlled oscillator is employed to provide digital output signals related to rate of rotation of fluid in the egress orifice of the vortex rate device and which may be digitally integrated to provide course error signals.

Yet another object of the present invention is to employ pressure controlled oscillators to sense rate and direction of rotation of a fluid in the egress orifice of a vortex rate sensor wherein the frequencies of oscillation of the oscillator vary differentially with direction and rate of rotation of the fluid.

The above and still further objects, features and advantages of the present invention will become apparent upon consideration of the following detailed description of several embodiments thereof, especially when taken in conjunction with the accompanying drawings, wherein.

Figure 1:
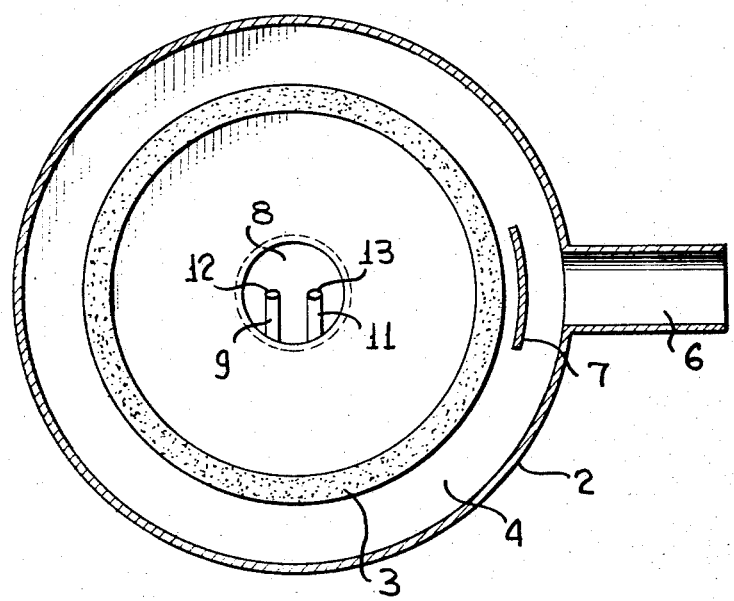
FIGURE 1 is a schematic diagram of a vortex rate-of-turn sensor of a type with which the apparent of the present invention may be employed.

Referring now specifically to FIGURE 1 of the accompanying drawings, there is illustrated a top view, with the upper cover removed, of a vortex rate-of-turn sensor with which the output apparatus of the present invention may be employed. The vortex sensor which is generally designated by the reference numeral 1 comprises an outer wall 2 and located coaxially therewith, but interiorly thereof, an annular porous wall 3. A region 4 is defined between the walls 2 and 3 into which fluid is introduced via a pipe 6. A baffle 7 is located in the region 4 in line with the pipe 6 so as to produce diffusion of the fluid through the region 4 as a method of equalizing the pressure of the fluid throughout the region 4. Coaxial with the annulus 3 is an egress orifice 8 through which fluid egresses from the device. Located in the egress orifice 8 are two tubes 9 and 11 which are inclined at about 45° relative to the longitudinal axis of the orifice. Actually, the position or angle of the pipes 9 and 11 is unimportant but the ingress orifices 12 and 13, respectively, should be inclined at about 45° with respect to the axis of the egress orifice.

When no rotation is imparted to the fluid interiorly of the annular wall 3, fluid flows axially through the orifice 8 and equal amounts of fluid flow to the pipes 9 and 11. However, when the fluid is caused to rotate, the flow of fluid to the two pipes 9 and 11 is unequal. As an example, if the fluid is rotating counterclockwise, and as is inherent in such systems, has at the same time a large axial flow, then the flow begins to become more normal to the plane of the ingress orifice 12 and begins to approach parallelism with the ingress orifice 13. Thus, the amount of fluid flowing to the pipe 12 increases while the amount of fluid flowing to the pipe 13 decreases. Conversely, if the flow is clockwise, the flow begins to approach the normal to the plane of the ingress orifice 13 and begins to approach parallelism with the plan of the ingress orifice 12 of the pipe 9. Under these circumstances, a greater quantity of fluid flows to the pipe 11 than flows to the pipe 9. More importantly, the changes in relative flows to the tubes 8 and 9 in the presence of changes in rotation of the fluid in the egress orifice 8 are differentially related.

In a conventional system, the flows to the pipes 9 and 11 would be applied to control nozzles of analog fluid amplifiers and the outputs of the amplifiers would be compared as an indication of the direction and rate of flow of the fluid in the egress orifice 8, and thus, as an indication of the rate of turn of the vortex device 1.

Figure 2:
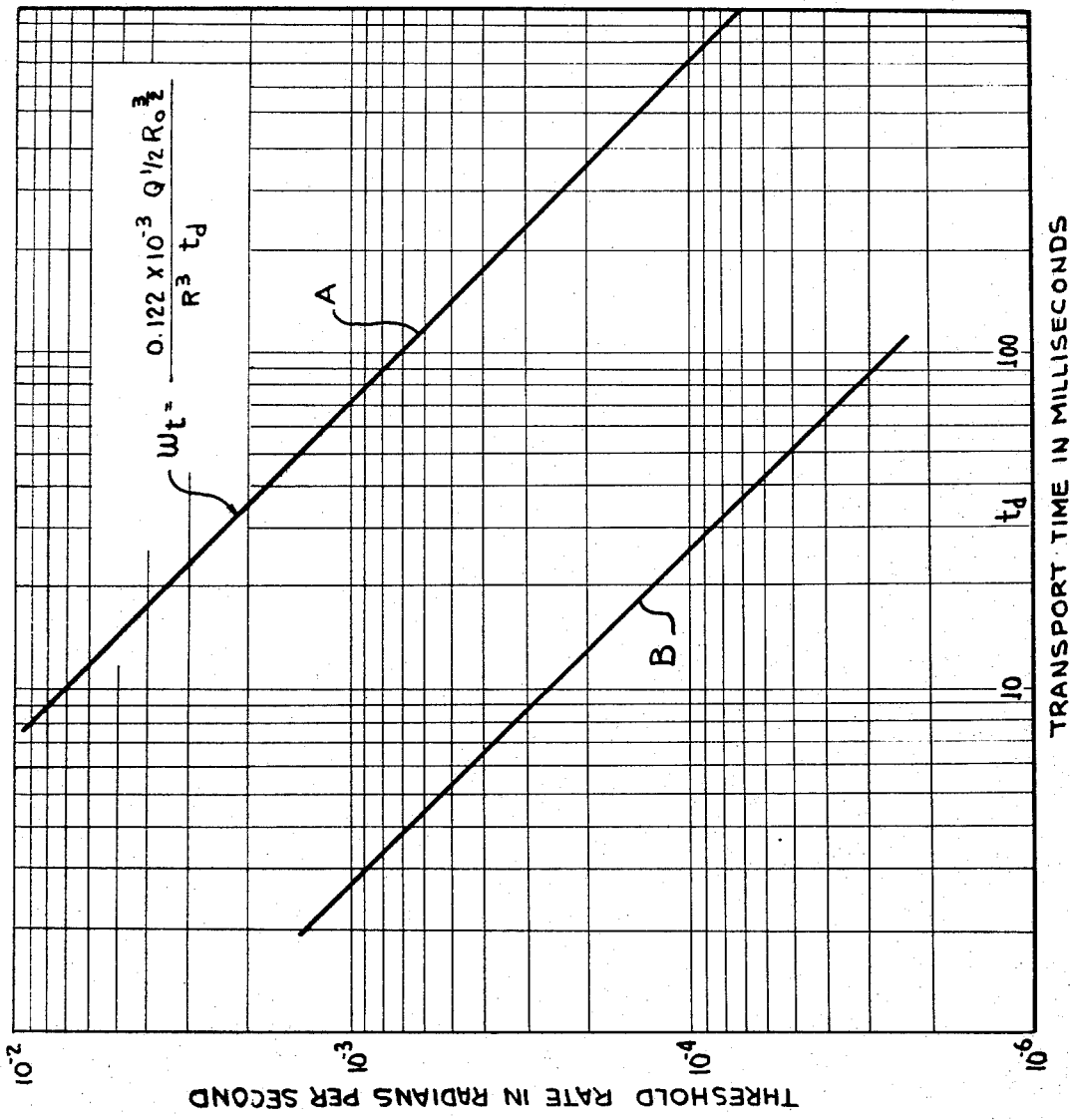
FIGURE 2 is a plot of threshold of response versus transport time of a prior art vortex rate-of-turn sensor and a vortex rate-of-turn sensor employing the readout sensing system of the present invention.

As previously indicated, the relationship between the threshold of rate of response in radians per second of a vortex rate-of-turn sensor plotted as a function of the transport time of the sensor is considered to be a figure of merit for rating such a device. Referring now specifically to FIGURE 2 of the accompanying drawings, the curve A is a plot of a vortex rate sensor available to the prior art. The equation presented on the curve is the equation defining the relationship between the threshold rate and transport time. Actually, both of these quantities are a function of the rate of flow of fluid through the pipe 6 and into the manifold 4 and thence through the remainder of the system. It will be noted, however, from the curve A of FIGURE 2 that as the transport time decreases the threshold rate of turn; that is, the minimum rate of turn which can be detected, increases. Thus, if one wishes to have a device with a rapid response, say a ten millisecond response, the minimum rate of turn that can be detected is $4 \times 10^{-2}$ radians per second. On the other hand, if it is necessary to be able to detect rates of turn of $10^{-4}$ radians per second, one must be satisfied with a transport time of seven hundred milliseconds; that is, seven-tenths of a second. The relationship between threshold response and transport time is apparent when it is realized that the transport time is, in effect, a function of the rate at which fluid flows through the system, such that as the rate increases, the transport time decreases. It is also apparent, however, that as the rate of flow of fluids through the system is increased, the noise of the system increases.

As previously indicated, it is one object of the present invention to be able to improve the performance of a vortex rate sensor, and more particularly, to be able to actually decrease the threshold for a given transport time or conversely, to decrease the transport time for a given threshold of response. In accordance with one feature of the present invention, a great improvement in this characteristic is obtained by eliminating upper frequency noises in the system by integrating all signals above the desired maximum rate of response required of the apparatus. This is accomplished in accordance with another feature of the present invention, by employing a pressure controlled oscillator to sense variations in the rate of rotation of the fluid in the vortex rate sensor; the frequency of oscillation of the oscillator being a linear function of the pressure applied thereto. An oscillator cannot respond to frequences as great as its frequency of oscillation and thus, the oscillator itself becomes an integrating device which averages out all signals above a specific frequency. It is found that the majority, or a very large proportion of the systematic noise in a vortex sensor lies well above the response times or frequencies required of the vortex rate sensor in most practical systems. Thus, by properly choosing the maximum rate of oscillation of the pressure controlled oscillator in conformance with the response frequencies required of the system, the effects of a large proportion of the noise signals in the vortex amplifier are eliminated since the high frequency systematic noise has been integrated to zero. It has been found that the systematic noise lying above the required rate of response of the system is at least ten times the noise over the range of operation and thus, as a result of its elimination, the threshold rate for a given transport time is immediately decreased; that is, the device can sense smaller rates of rotation than would otherwise be possible since the noise amplitude is reduced in the readout rendering lower amplitude signals detectable by the system. Actually, a practical device employing a pressure controlled oscillator was tested with a vortex rate sensor and it was found that the curve relating threshold rate and transport time was shifted to the curve B where the minimum design rate of oscillation of the pressure controlled oscillator was sixty cycles per second. The linear range of the oscillator was from sixty to one hundred twenty-five cycles per second with a sensitivity of thirty cycles per second per inch of water.

The oscillator employed in the tests was employed in a system designed to respond to changes of a maximum rate of twenty cycles per second.

It is apparent that a pressure control oscillator which is useful with a system of the present invention must be relatively stable and must have a linear frequency versus characteristic curve. An oscillator suitable for use in the system of this invention and which was employed in the aforesaid tests is described in a co-pending application of Francis M. Manion, Ser. No. 430,696, entitled "Pressure Controlled Oscillator" and filed on concurrent date herewith. The details of the oscillator construction are not discussed herein since they form no part of the present invention. It is sufficient to say that the stability of the oscillators was one part in ten thousand and had a sensitivity of thirty cycles per second per inch of water.

Figure 3:
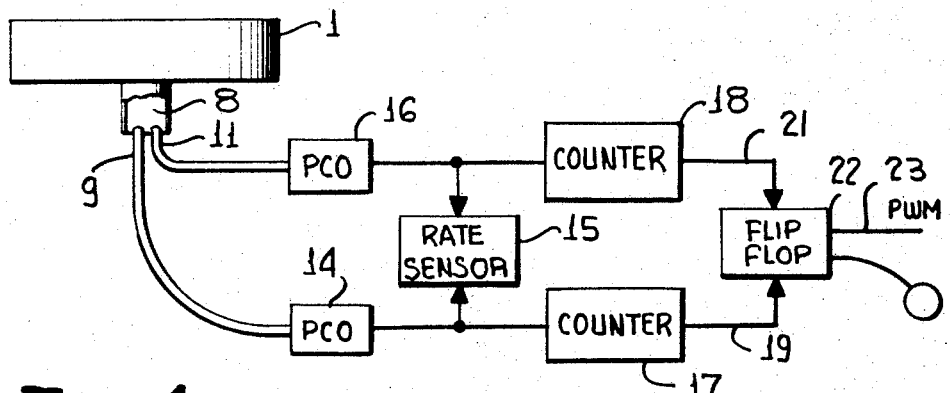
FIGURE 3 is a schematic diagram of the sensing system of the present invention.

Reference is now made to FIGURE 3 of the accompanying drawings where is illustrated a system employing pressure controlled oscillators to provide a readout signal for a vortex amplifier of the type illustrated in FIGURE 1. This system is provided with two pressure controlled oscillators 14 and 16 connected to the tubes 9 and 11, respectively, of FIGURE 1 of the accompanying drawings. An important feature of this type of system is that the oscillators can operate directly from the signals generated in the passages 9 and 11 and no analog amplification is required. More particularly, the flow pressure in pipes 9 and 11 in a conventional vortex rate-of-turn sensor is sufficient (a minimum of at least 0.3 inches of water) to be supplied directly to the power nozzle of the pressure controlled oscillators. The oscillators are substantially identical in design, having the same degree of stability and the same frequency versus pressure function. When there is no rate of rotation introduced into the system, the oscillators 14 and 16 oscillate at the same frequency. By determining the difference in frequency of the two oscillators, one can determine the rate of rotation of the system. Where, as stated immediately above, no rate of rotation is introduced into the system, the frequencies of the two oscillators are the same and no difference is detected. However, if clockwise rotation is introduced into the system, the rate of rotation of the oscillator 16 increases and the rate of oscillation of the oscillator 14 decreases producing a differential in the rates of oscillation which may be readily detected. An important feature of the use of two pressure control oscillators is that the difference in frequency between the two oscillators is insensitive to changes in supply pressure; that is, pressure supplied to the system via the pipe 6. Since the characteristics of the two oscillators are the same, an increase in overall D.C. or steady state pressure increases the frequency of oscillation of both oscillators by the same number of cycles per second, and conversely, a decrease in pressure decreases the rate of oscillation of the two oscillators by the same number of cycles per second. Thus, the frequencies of the oscillators drift precisely the same number of cycles and an output system does not detect any change since it senses differences in rates of oscillation and nothing else. Also, since analog amplifiers are not required in the connections between the pipes 9 and 11 and the oscillators 14 and 16, respectively, the system is insensitive to drift in any point in the system. It is known that drift in analog systems is extremely difficult to overcome and it represents a constant source of error. One point that should be mentioned is that the impedance of the tubes 8 and 9 must be matched to the impedances of the power nozzles of the oscillators for operation over the desired range.

Rate of turn may be detected by applying the output signals of the oscillators 14 and 16 to an FM discriminator 15 such as described in the copending application of John R. Colston, Ser. No. 293,108, filed July 5, 1963, for "Turbine Speed Control," now U.S. Patent Number 3,292,648 and assigned to the same assignee of the present invention.

Figure 4:
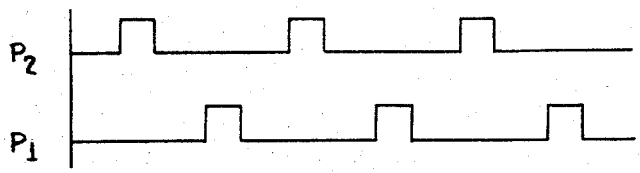
FIGURE 4 is a plot of two pulse trains produced by the apparatus of FIGURE 3.

If it is desired to provide a course signal, the signal provided by oscillators 14 and 16 must be integrated. This integration is also effected digitally by the apparatus of the present invention by employing counters 17 and 18 and flip-flop 22. More particularly, the pulses appearing at the output passages of oscillators 14 and 16 are applied to counters 17 and 18, respectively, while their output pulse trains, P1 and P2 of FIGURE 4, are applied via passages 19 and 21, respectively, to opposed control nozzles of a flip-flop 22. The flip-flop 22 produces a pulse-width modulated signal in one or both of its output passages, for instance, a passage 23. Referring specifically, for a moment, to FIGURE 4, the pulse patterns appearing in the passages 19 and 21 are represented by the graphs P1 and P2, respectively. Pulse train P2, for instance, actuates the flip-flop 22 so that fluid is directed to the passage 23. The pulses of train P1 actuate the flip-flop 22 so that the fluid is directed away from the passage 23. If the pulses P1 lie halfway between the pulses P2 and the frequencies are the same, then the flip-flop 22 supplies fluid to the passage 23 one-half of the time. Such a condition on the lead 23 indicates that the fluid supplied to the egress orifice 8 is not rotating; that is, that the vortex rate sensor is not rotating. The oscillators are sufficiently stable that the phase relationship between the oscillators, commanded by the history of rotation of the sensor 1, is maintained over an extended period sufficient for many purposes.

If the fluid in the sensor now begins to rotate, counterclockwise for instance, thus increasing the frequency of oscillation of the oscillator 14, the pulses P1 begin to move towards the left relative to the pulses P2 and the interval during which the fluid is directed to the passage 23 from the flip-flop 22 decreases. Thus, while the flow intervals to the passage 23 decrease, the no-flow intervals increase. If now the rate of rotation again becomes zero the oscillators oscillate at the same frequency but the phase remains as last commanded so that the pulse widths on line 23 represent the change in course. Conversely, if the fluid in the sensor 1 rotates clockwise, the slip between the two pulse trains P1 and P2 is in the opposite direction and the intervals during which fluid is directed to the passage 23 increases and the intervals during which it is directed away decrease.

It is apparent then that by examining the flow intervals (duty cycle of flow) to the passage 23, it is possible to determine the history of rotation of the sensor, i.e. the change in course, if any. The apparatus of FIGURE 3, it will be noted, employs all digital elements, and thus the system is devoid of error resulting from changes in pressure levels, biases and other D.C. flow parameters in the system. All that is necessary then is that any amplifier, counter, flip-flop, etc. be operable over the range of amplitudes of the various signals supplied to the system.

The interval of integration of the apparatus of FIGURE 3 is a function only of the stability of the oscillators since the integration interval of the digital circuitry is infinite, i.e. there is no loss of information with time. The oscillator stability as indicated above is at least one part in ten thousand or better and is thus sufficient for many course measuring functions.

In the system of FIGURE 3, the oscillators 14 and 16 may be initially synchronized 180° out of phase. Synchronization can be effected by bringing the vent holes of the amplifiers of the oscillators close to one another.

The system will quickly slip into a 180° out-of-phase relationship due to steering in response to signals in passage 23. The angle introduced by such slip must and normally will lie within the allowable error of the system.

Integration of the rate signals may also be effected by applying the output pulses P1 and P2 to a reversible counter so that the count at any time represents the accumulated course error or change over the interval from energizaton of the system. Such a system readily lends itself to visual display and also is completely suitable for use in control systems. A reversible counter which is suitable for use in such a system is described and illustrated in the September 1964 edition of "Control Engineering" on p. 83.

The readout apparatus of the present invention has been described as applicable to a vortex rate sensor since it was for use with such a device that the invention was developed. It is apparent, however, that the system is equally applicable as a readout device for vortex amplifiers and also to most situations where it is desired to compare two pressures. So long as the pressures lie in ranges that permit the use of pressure controlled oscillators having matched characteristic, the frequencies of the oscillators provide information directly correlated to the changes. Also, since the signals are digital in form, they may be accurately integrated. Thus, the system of the invention provides an accurate means for making measurements of pressure variations and for accumulating signals relating to the variatons. For instance, if the oscillators respond to pressures across a venturi then the instantaneous difference in frequencies represents flow rate and the integrated signal represents total flow.

While I have described and illustrated several specific embodiments of my invention, it will be clear that variation of the details of construction which are specifically illustrated and described may be resorted to without departing from the true spirit and scope of the invention as defined in the appended claims.

What I claim is:

1. A vortex rate sensor readout system comprising means for developing a differential fluid pressure which varies in amplitude as a function of rate of rotation of fluid in at least one egress orifice of a vortex rate sensor and which varies in polarity in response to respective first and second directions of rotation of fluid in said at least one egress orifice of a vortex rate sensor, pressure controlled oscillator means connected to said means for developing said fluid pressure differential such that its frequency of oscillation varies as a function of said fluid differential pressure, and means for determining the variations of frequency of oscillation of said oscillator means as a measure of rate of rotation of fluid in the egress orifice of a vortex unit.

2. A readout system for vortex elements in which the direction and the rate of rotation of fluid in an egress orifice of the vortex unit is dependent upon a function applied to the unit, said readout system comprising means for developing a differential fluid pressure which varies in amplitude as a function of rate of rotation of fluid in the egress orifice of the vortex unit, said differential fluid pressure having a polarity as a function of the sense of rotation of fluid in the egress orifice of the vortex unit, pressure controlled oscillator means connected to said means for developing a differential fluid pressure such that the frequency of oscillation of said oscillator means varies as a function of said fluid pressure, and means for determining the variations of frequency of oscillation of said oscillator as a measure of rate and sense of rotation of fluid in the egress orifice of the vortex unit.

3. The combination according to claim 4 wherein said pressure controlled oscillators have a linear frequency versus pressure characteristic over the range of variations of the pressures produced by said means.

4. A readout system for vortex amplifiers in which the direction and rate of rotation of fluid in an egress orifice of the vortex unit is dependent upon a function applied to the unit, said readout system comprising means for developing two pressures which vary differentially as a function of direction and rate of rotation of fluid in the egress orifice of the vortex unit, two pressure controlled oscillators connected to said means such that their frequencies of oscillation vary about respective center frequencies as a function of the differentially varying fluid pressures developed by said means, and means for determining the sense and difference in the frequencies generated by said oscillators as an indication of the direction and rate of rotation of fluid in the egress orifice.

5. The combination according to claim 4 further comprising means for producing a signal which is an integrated function of the sense and difference in frequencies of said oscillators.

6. A readout system for a vortex rate sensor of the type in which a substantial portion of noise signals produced in said sensor have frequencies above a predetermined frequency, said readout system comprising:

means for developing a fluid pressure signal which varies in amplitude and sense relative to a reference pressure as a function of the rate and sense of rotation of fluid in an egress orifice of the vortex rate sensor unit;

pressure controlled oscillator means responsive to said fluid pressure signal for providing an oscillatory sginal having a frequency which varies about a center frequency as a function of said fluid pressure signal, said oscillator producing a maximum frequency over the operating range of said vortex sensor which is at most equal to said predetermined frequency;

and means for determining the frequency variations of said oscillatory sginal as a measure of the rate and sense of rotation of fluid in the egress orifice of the vortex rate sensor unit.

7. The combination according to claim 6 wherein said pressure controlled oscillator means comprises a fluidic pressure controlled oscillator having a linear frequency versus pressure characteristic over the range of variations in said fluid pressure signal.

8. The combination according to claim 6 wherein said means for developing provides two fluid pressure signals which vary differentially as a function of direction and rate of rotation of fluid in the egress orifice of the vortex rate sensor unit, said pressure controlled oscillator means comprising two pressure controlled fluid oscillators, one each responsive to a respective one said two fluid pressure signals, for providing output signals having frequencies which vary about respective center frequencies as a function of the fluid pressure signal variations, and means for determining the sense and difference in the frequencies generated by said oscillators as an indication of the direction and rate of rotation of fluid in the egress orifice of the vortex rate sensor unit.

9. The combination according to claim 8 further comprising means for producing a signal which is an integrated function of the sense and difference in frequencies of said oscillators.

10. A readout system for vortex elements in which the direction and rate of rotation of fluid in an egress orifice of the vortex unit is dependent upon a function applied to the unit, said readout system comprising means for developing two fluid pressures which vary differentially relative to a reference pressure as a function of direction and rate of rotation of fluid in the egress orifice of the vortex element, a pair of pressure controlled oscillators having the same linear frequency-versus-pressure characteristics over the operating range of variations in pressures generated by said means for developing, each said oscillator connected to receive a different one of said fluid pressures whereby the frequencies of said oscillators vary differentially as said fluid pressures vary differentially, counter means for dividing each of said frequencies by the same predetermined factor to produce signal pulses in which the pulses from one oscillator lie midway between pulses from the other oscillator at said reference pressure and means for determining the spacing between said pulses to provide a signal which is an integrated function of the sense and difference in frequencies of said oscillators.

11. The combination according to claim 10 wherein said means for determining comprises a fluid flip-flop having opposed control nozzles and at least one output passage, means applying the output pulses generated by each of said counters to a different one of said control nozzles so as to produce a pulse-width modulated signal in said output passage.

12. A readout system for vortex elements in which the direction and rate of rotation of fluid in an egress orifice of the vortex unit is dependent upon a function applied to the unit, said readout system comprising means for developing two fluid pressures which vary differentially relative to a reference pressure as a function of direction and rate of rotation of fluid in the egress orifice of the vortex element, a pair of pressure controlled oscillators having the same linear frequency-versus-pressure characteristics over the operating range of variations in pressure generated by said means for developing, each said oscillator connected to receive a different one of said fluid pressures whereby the frequencies of said oscillators vary differentially as said fluid pressure vary differentially, counter means for dividing each of said frequencies by the same predetermined factor to produce signal pulses in which the pulses from one oscillator lie midway between pulses from the other oscillator at said reference pressure and means for determining the difference in counts of said counting means to provide a signal which is an integrated function of the sense and difference in frequencies of said oscillators.

13. The combination according to claim 12 wherein said last-mentioned means is a reversible counter.

14. The combination according to claim 6 wherein the maximum frequency produced by said oscillator over the operating range of said vortex sensor is less than said predetermined frequency.

15. A readout system for vortex amplifiers in which the rate of rotation of fluid in an egress orifice of the vortex amplifier is dependent upon a function applied to the amplifier, said readout system comprising:
means for developing two pressures which vary differentially as a function of rate of rotation of fluid in the egress orifice of the vortex amplifier;
two pressure controlled oscillators connected to said means such that their frequencies of oscillation vary about respective center frequencies as a function of the differentially varying fluid pressures developed by said means; and
means for determining the difference in the frequencies generated by said oscillators as an indication of the rate of rotation of fluid in the egress orifice of the vortex amplifier.

16. A readout device for vortex rate of turn sensors comprising means for producing two fluid pressures which vary differentially over a positive range of pressures as a function of direction and rate of rotation of fluid in the vortex rate of turn sensor, said means for producing comprising a pair of Pitot tubes having entrance orifices lying in a plane which is at an angle relative to the flow to be measured, two pressure controlled fluid oscillators each connected to receive different ones of said two fluid pressures so that each oscillator signal varies about a center frequency as a function of said respective fluid pressure, said pressure controlled oscillators having substantially the same linear frequency versus pressure characteristics over the range of pressure variations of said two fluid pressures, and means for producing a signal which is an integrated function of the sense and difference of the frequencies of said oscillators.

17. A readout device for vortex rate of turn sensors comprising means for producing two fluid pressures which vary differentially over a positive range of pressures as a function of direction and rate of rotation of fluid in the vortex rate of turn sensor, two pressure controlled fluid oscillators each connected to receive different ones of said two fluid pressures so that each oscillator signal varies about a center frequency as a function of said respective fluid pressure, said pressure controlled oscillators having substantially the same frequency versus pressure characteristics over the range of pressure variations of said two fluid pressures, and means for producing a signal which is an integrated function of the sense and difference of the frequencies of said oscillators, wherein is provided an egress passage for the vortex rate of turn sensor and wherein said means for producing comprises a pair of pressure sensing passages having their entrance orifices located in said egress passage, said orifices being inclined relative to the longitudinal axis of said egress passage so as to always be subject to a positive pressure.

18. A readout unit for vortex elements in which the direction and rate of rotation of fluid in an egress orifice of the vortex unit is dependent upon a function applied to the unit, said readout system comprising means for developing two fluid pressures which vary differentially as a function of rate and sense of rotation of fluid in the egress orifice of the vortex unit, two pressure controlled fluid oscillators each connected to receive different ones of said two fluid pressures so that each oscillator signal varies about a center frequency as a function of said respective fluid pressure, said pressure controlled oscillators having substantially the same linear frequency versus pressure characteristics over the range of pressure variations of said two fluid pressures, means for producing a signal which is an integrated function of the sense and difference of frequencies of said oscillators, and means for determining the sense and difference in the frequencies generated by said oscillators as an indication of the direction and rate of rotation of fluid in the egress orifice of the vortex unit.

References Cited

UNITED STATES PATENTS

| | | | |
|---|---|---|---|
| 2,315,756 | 4/1943 | Warner | 73—398 X |
| 2,476,804 | 7/1949 | Boykin | 324—79 X |
| 3,071,974 | 1/1963 | Peterson | 73—517 X |
| 3,261,209 | 7/1966 | Rae | 73—194 |
| 3,274,828 | 9/1966 | Pulvari | 73—398 X |
| 3,238,960 | 3/1966 | Hatch. | |
| 3,273,377 | 9/1966 | Testerman et al. | 73—23.1 |
| 3,320,815 | 5/1967 | Bowles. | |

OTHER REFERENCES

Forbes Taylor Brown Thesis, M.I.T. Dept. of Mechanical Engr.; May 1962; pp. 127 and 128.

RICHARD C. QUEISSER, *Primary Examiner.*

E. D. GILHOOLY, *Assistant Examiner.*